US012680636B2

(12) United States Patent
Nowak et al.

(10) Patent No.: US 12,680,636 B2
(45) Date of Patent: Jul. 14, 2026

(54) SEALING DEVICE AND METHOD FOR THE PRODUCTION THEREOF AND PIPELINE SYSTEM

(71) Applicant: Glatt Gesellschaft mit beschränkter Haftung, Binzen (DE)

(72) Inventors: Reinhard Nowak, Loerrach (DE); Julian Keser, Eimeldingen (DE); René Thal, Efringen-Kirchen (DE); Stefan Mühlhans, Efringen-Kirchen (DE); Lars Steinke, Loerrach (DE); Andreas Kopf, Weil am Rhein (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 10 days.

(21) Appl. No.: 17/791,658

(22) PCT Filed: Dec. 16, 2020

(86) PCT No.: PCT/EP2020/086508
§ 371 (c)(1),
(2) Date: Jul. 8, 2022

(87) PCT Pub. No.: WO2021/139988
PCT Pub. Date: Jul. 15, 2021

(65) Prior Publication Data
US 2023/0084703 A1 Mar. 16, 2023

(30) Foreign Application Priority Data
Jan. 10, 2020 (DE) ..................... 10 2020 200 271.1
Oct. 9, 2020 (DE) ..................... 10 2020 212 767.0

(51) Int. Cl.
*F16L 23/22* (2006.01)
*F16L 23/00* (2006.01)

(52) U.S. Cl.
CPC ............. *F16L 23/22* (2013.01); *F16L 23/006* (2013.01)

(58) Field of Classification Search
CPC ......... F16L 23/18; F16L 23/22; F16L 17/067; F16L 17/08; F16J 15/3296
See application file for complete search history.

(56) References Cited

U.S. PATENT DOCUMENTS 2,699,344 A * 1/1955 Bissell .................... F16L 23/18
285/341
3,047,937 A * 8/1962 De Vecchi .............. F16L 23/18
285/55
3,398,978 A * 8/1968 Gasche ................... F16L 23/22
285/368

(Continued)

FOREIGN PATENT DOCUMENTS

CN 107725931 A 2/2018
CN 109282097 A * 1/2019 ............. F16L 23/18
(Continued)

*Primary Examiner* — Matthew Troutman
*Assistant Examiner* — Fannie Kee
(74) *Attorney, Agent, or Firm* — The Webb Law Firm

(57) ABSTRACT
A sealing device for sealing a pipeline arrangement, a method for the production of a sealing device, and a pipeline system including a sealing device and a pipeline arrangement. The sealing device includes a seal and data medium assigned to the seal with electronic data memory to which seal specific information can be or is written.

9 Claims, 6 Drawing Sheets

(56)         References Cited

U.S. PATENT DOCUMENTS

| | | | | |
|---|---|---|---|---|
| 3,455,583 | A * | 7/1969 | Kenneth | F16L 23/22 |
| | | | | 285/368 |
| 4,900,063 | A | 2/1990 | Baarfusser et al. | |
| 5,749,586 | A * | 5/1998 | Abe | F16L 23/22 |
| | | | | 264/234 |
| 5,839,765 | A * | 11/1998 | Carter | F16L 23/18 |
| | | | | 285/332.2 |
| 7,107,662 | B1 * | 9/2006 | Levario | F16L 23/18 |
| | | | | 285/55 |
| 7,158,034 | B2 * | 1/2007 | Corbett, Jr. | F16J 15/3296 |
| | | | | 340/572.1 |
| 8,264,347 | B2 | 9/2012 | Castleman | |
| 8,997,877 | B2 | 4/2015 | Waldron et al. | |
| 10,145,498 | B2 | 12/2018 | Shimizu | |
| 10,591,097 | B2 | 3/2020 | Nahrwold et al. | |
| 12,007,049 | B2 | 6/2024 | Nowak et al. | |
| 2007/0012117 | A1 | 1/2007 | Hiroki et al. | |
| 2009/0200797 | A1 * | 8/2009 | Carson | F16L 23/18 |
| | | | | 285/414 |
| 2010/0283208 | A1 * | 11/2010 | Hering | F16J 15/3296 |
| | | | | 277/317 |
| 2010/0314865 | A1 * | 12/2010 | Hatton | F16L 23/18 |
| | | | | 285/412 |
| 2011/0049878 | A1 | 3/2011 | Goode | |
| 2014/0361535 | A1 | 12/2014 | Lutz et al. | |
| 2015/0059911 | A1 * | 3/2015 | Petrov | F16L 23/18 |
| | | | | 264/171.12 |
| 2020/0302256 | A1 * | 9/2020 | Newman | F16J 15/3296 |

FOREIGN PATENT DOCUMENTS

| | | | | |
|---|---|---|---|---|
| DE | 484005 | | 10/1929 | |
| DE | 2119547 | | 11/1971 | |
| DE | 3806630 | A1 | 9/1989 | |
| DE | 19507854 | A1 | 9/1995 | |
| DE | 102010021834 | A1 * | 12/2011 | F16L 23/18 |
| DE | 102016005385 | A1 | 11/2017 | |
| EP | 1507111 | A1 * | 2/2005 | F16L 23/18 |
| EP | 2138744 | A1 | 12/2009 | |
| EP | 2242004 | A1 | 10/2010 | |
| GB | 692571 | | 6/1953 | |
| GB | 702806 | | 1/1954 | |
| JP | S49115712 | U | 10/1974 | |
| JP | S54144419 | U | 10/1979 | |
| JP | 2001517287 | A | 10/2001 | |
| JP | 200999100 | A | 5/2009 | |
| JP | 2009294924 | A | 12/2009 | |
| JP | 2011519408 | A | 7/2011 | |
| JP | 2012184812 | A | 9/2012 | |
| JP | 2013525696 | A | 6/2013 | |
| JP | 2016223587 | A | 12/2016 | |
| JP | 201952677 | A | 4/2019 | |
| NO | 20131699 | A1 * | 6/2015 | F16L 23/18 |
| WO | 9837352 | A1 | 8/1998 | |
| WO | 2010036388 | A1 | 4/2010 | |
| WO | WO-2013042573 | A1 * | 3/2013 | F16L 23/18 |
| WO | WO-2014106630 | A1 * | 7/2014 | F16L 23/22 |
| WO | 2014192442 | A1 | 12/2014 | |

* cited by examiner

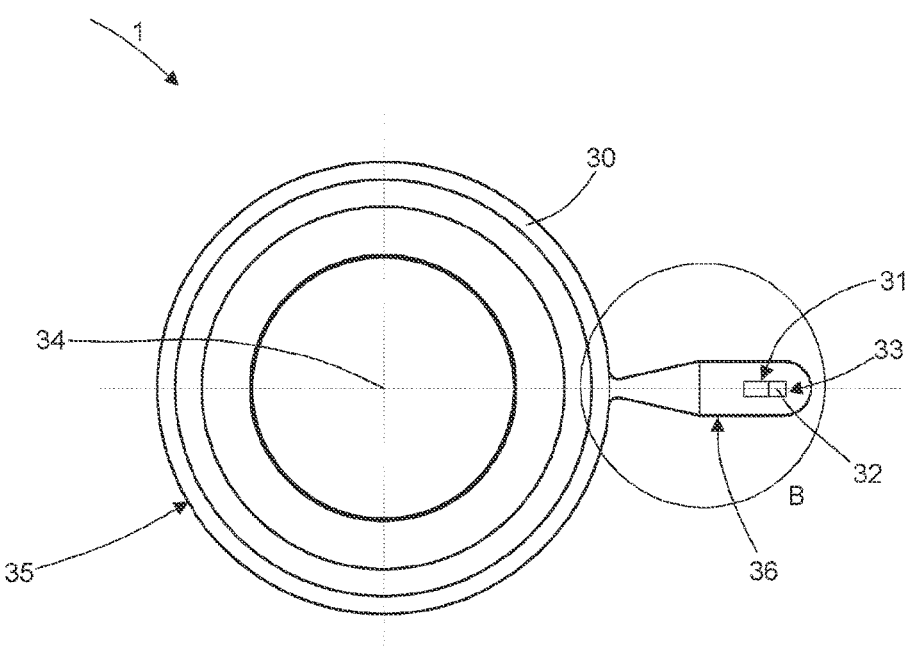
Fig. 7
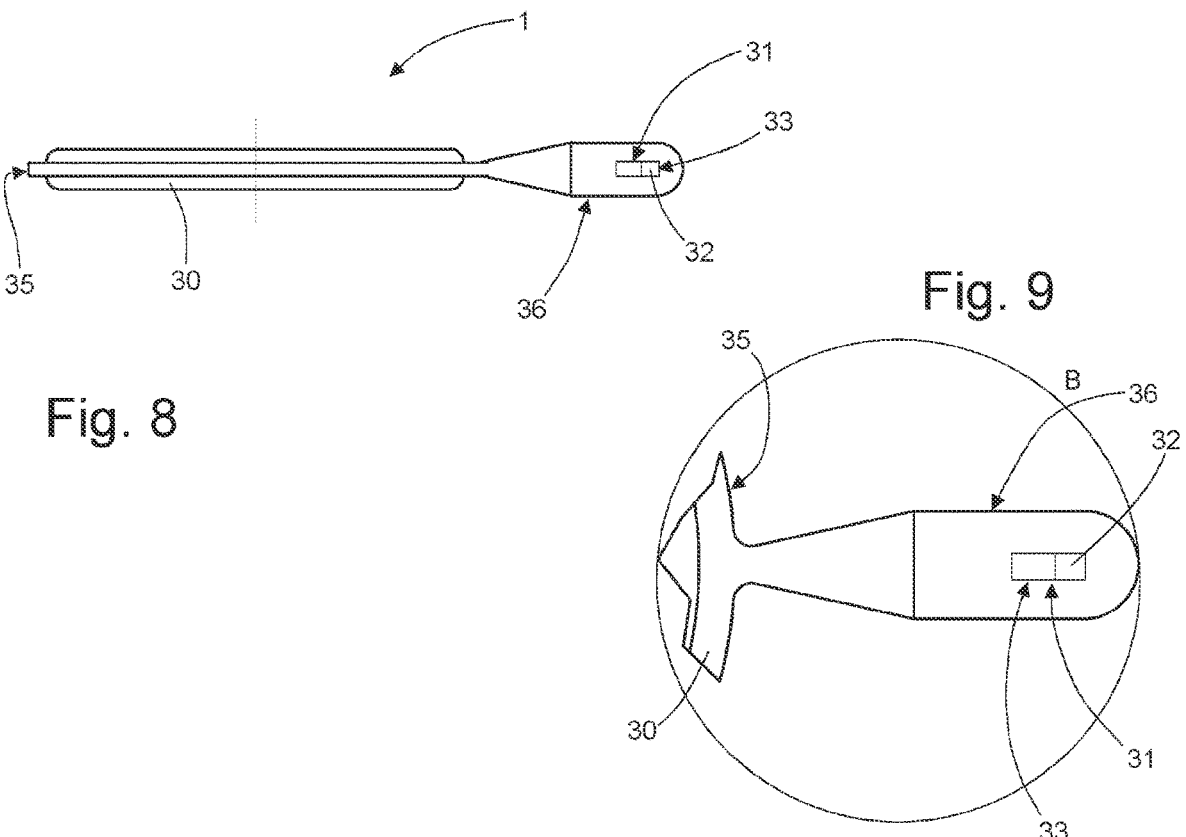
Fig. 8
Fig. 9

SEALING DEVICE AND METHOD FOR THE PRODUCTION THEREOF AND PIPELINE SYSTEM

CROSS-REFERENCE TO RELATED APPLICATIONS

This application is the United States national phase of International Application No. PCT/EP2020/086508 filed Dec. 16, 2020, and claims priority to German Patent Application Nos. 10 2020 200 271.1 filed Jan. 10, 2020 and 10 2020 212 767.0 filed Oct. 9, 2020, the disclosures of which are hereby incorporated by reference in their entirety.

BACKGROUND

Field

The invention relates to a sealing device for sealing a pipeline arrangement having two pipeline units with a pipeline central axis and a clamping device, wherein a pipeline unit comprises a pipeline having a pipeline outer surface, a pipeline end face and a pipeline outer diameter and a pipe socket with a pipe socket inner diameter and the pipe socket is provided with a flange section having a flange section end face and a pipe section having a pipe section inner surface, and wherein the clamping device clamps the flange sections of the pipe sockets of the two pipeline units axially to each other, wherein the sealing device has in its position of use a seal located axially between the flange section end faces of the pipe sockets.

The invention moreover relates to a pipeline system.

The invention furthermore relates to a method for the production of a sealing device for sealing a pipeline arrangement.

Description of Related Art

Sealing devices in various embodiments, in particular in the form of O-rings, have been part of prior art for a long time. These sealing devices have the disadvantage that they become brittle in the course of time and seal-specific information on the outer surface of the sealing device is no longer identifiable, so that a tracing of such information involves major difficulties.

The invention is therefore posed on the problem of providing a lo sealing device and a method for the production of the sealing device, wherein the tracing of the sealing device is significantly simplified and the disadvantages of prior art are eliminated.

In a sealing device of the type referred to at the beginning, this problem is solved by providing that the sealing device has a data medium assigned to the seal and comprising an electronic data memory to which seal-specific information can be or is written. The writable, preferable re-writable data memory of the data medium permits a flexible data management of the sealing device. The seal-specific information on the data medium, in particular on the RFTD transponder, can be altered, erased or added to at any time. Product, production, maintenance or service data in particular are thus directly available at the sealing device as seal-specific information at any time. The sealing device is expediently in particular designed for clamp fittings according to DIN 32676.

SUMMARY

In this the data medium comprising the data memory can be located in the seal or outside the seal. According to an advantageous configuration of the sealing device, the data medium assigned to the seal is located in the seal. The data medium located in the seal is always clearly assigned to the seal, being built into the seal. The data medium is for example connected substantially inseparably to the seal, i.e. the seal and the data medium cannot be separated without destroying the seal.

According to an advantageous configuration of the sealing device, the data medium assigned to the seal is located outside the seal. The data medium assigned to the seal is expediently located on the outside of the seal. This in particular permits a spatial separation between seal and data medium. The data medium is for example provided at a point different from the seal, so that seal and data medium do not have any direct contact. This eliminates the risk that a medium carried in the pipeline arrangement having pipeline units and having to be sealed against the environment can come in contact with the data memory. The e.g. aggressive medium, such as an acid, an alkali or the like, can then corrode the seal in particular, but the data medium can always be read, so that the information stored on the data medium can always be retrieved.

Three different data media can advantageously be used:

Data media which are exclusively readable and written on once by the supplier, wherein it is not possible, however, to add, delete or overwrite seal-specific information retrospectively. The production date and the properties of the sealing device are here installed by the manufacturer as seal-specific information, for example.

Data media can be written on once by the manufacturer or the customer and read out as often as required. This offers the customer the chance of e.g. installing the installation date of the sealing device in a system or the like as further seal-specific information on the data medium. In this it is advantageous that after the single installation of the seal-specific information only reading out is possible. This prevents an accidental or deliberate change of the seal-specific information, whereby the quality of the system is improved.

Data media permitting unlimited writing and reading of the data memory by the manufacturer or customer. It is also possible to block the data media for both writing and reading by setting a write protect.

The sealing device is preferably used in building pipelines or plant, in the bio, pharmaceutical, chemical or food industry, or in the sanitary area.

In this respect the data memory of the data medium is readable, in particular in a contactless manner. The data medium of the sealing device is preferably designed as an RFID transponder. The contactless communication between RFID transponder and read-write system offers a high insensitivity with regard to pollution, for example by installation in protected locations, an invisible integration into existing products and a simplified process optimisation. Each data medium is furthermore provided with a clear assignment, thanks to a serial number issued only once globally. This ensures the precise assignment on single product level and a complete product individualisation. The simultaneous reading of several transponders in one working step is possible as well, thus accelerating the working processes.

According to a further advantageous configuration of the sealing device, the seal is configured to form a defined transition between two pipeline units clamped to each other, so that there is no accumulation of residues of the medium or media flowing through the pipeline arrangement.

In accordance with a further preferred form of the pipeline arrangement, the seal has a seal insert configured to define an axial minimum distance between the two pipeline units. The adjustment of an axial minimum distance between the two pipeline units by means of the seal comprising a seal insert is advantageous, because the maximum contact pressure of the sealing surfaces can be predetermined. In addition, since the minimum distance between the two pipelines cannot be undershot because of the seal insert, there is no need for reworking at the pipeline units, in particular at the respective pipes.

The seal insert preferably has a seal insert end face designed as a stop. A seal insert end face designed as a stop permits a simple realisation of limiting the minimum distance between the two pipeline units to be clamped. It is particularly preferred if the data medium is designed as a part of the seal insert. The data medium thus forms a part of the seal insert.

According to an additional advantageous further development of the sealing device, the seal has a seal outer surface which extends radially around a sealing device central axis and at which a seal section having the data medium is located. As a result, the data medium, in particular the data medium designed as an RFID transponder, can be read better in the state of use of the sealing device. The clamping device is designed as an articulated clamp and the seal section is, or is preferably, guided towards the outside by an articulated clamp joint of the clamping device.

The seal is advantageously made of rubber, preferably of nitrile rubber, perfluoro rubber, silicone, polyethylene or polytetra-fluoroethylene.

The problem is preferably solved by a pipeline system comprising a pipeline arrangement and a sealing device as described herein.

In a method of the type referred to at the beginning, this problem is furthermore solved by providing that the sealing device is has an electronic data medium which is located in the seal and can be or is written on with seal-specific information, wherein the data medium is cast with the seal as an insert part, the method comprising the steps of:

a) Placing the data medium in a tool, b) Filling the tool with sealing material, and c) Removing the sealing device produced from the tool.

This method permits a fast and cost-effective production of the sealing device. The method advantageously is an injection moulding method or a compression moulding method. The sealing device is thus expediently designed for clamp fittings according to DIN 32676. In step a) a seal insert comprising the data medium is preferably placed in the tool. This has the advantage that there is no need for a seal section which can simply be separated from the sealing device.

According to a further advantageous configuration, the sealing device produced by the method is a sealing device as described herein.

BRIEF DESCRIPTION OF THE DRAWINGS

The invention is explained in greater detail below with reference to the enclosed drawing, of which:

FIG. 7 is a top view of a first embodiment of a sealing device having a seal and a data medium, with detailed section B, FIG. 8 Is a side view of the first embodiment of a sealing device having a seal and a data medium, FIG. 9 is a detailed view of the detailed section B shown in FIG. 7.

DETAILED DESCRIPTION

Figure 1:
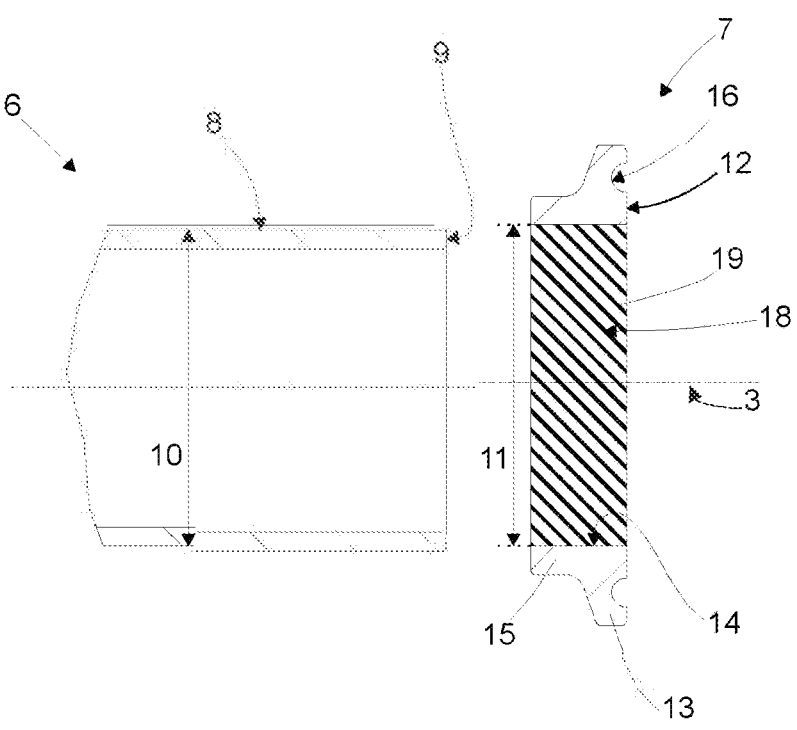
FIG. 1 is a sectional view of a pipeline and a pipe socket.

Unless stated otherwise, the following description relates to all embodiments of a sealing device 1 according to the invention for sealing a pipeline arrangement 2 as illustrated in the drawing.

The pipeline arrangement 2 has two pipeline units 4 with a pipeline central axis 3 and a clamping unit 5. The pipeline units 4 comprise a pipeline 6 and a pipe socket 7, the pipeline 6 and the pipe socket 7 being aligned to the pipeline central axis 3.

The pipeline 6 has a pipeline outer surface 8, a pipeline end face 9 and a pipeline outer diameter 10. In addition the pipeline 6 is designed in accordance with a specification relating to a pipe length and a pipe bend, a straight pipeline 1 being used in the illustrated embodiment. In other embodiments not illustrated the pipe length and the pipe bend are different.

The pipe socket 7 has a pipe socket inner diameter 11 and is provided with a flange section 13 having a flange section end face 12 and a pipe section having a pipe section inner surface 14. A groove 16 for the partial accommodation of a sealing device 1 is formed in the flange section end face 12 of the flange section 13.

The pipe section inner surface 14 furthermore has a structure 18 in the form of raised areas 19.

The pipe socket 7 is axially plugged onto the pipeline 6 in the axial direction of the pipeline central axis 3. In this the flange section end face 12 and the pipeline end face 9 are oriented flush with each other. In the illustrated embodiment the pipeline outer diameter 10 and the pipe socket inner diameter 11 are identical.

In another embodiment not illustrated, the pipeline outer diameter 10 of the pipeline 6 is larger than the pipe socket inner diameter 11 of the pipe socket 7. This immediately generates a press-fit when the pipe socket 7 is axially plugged to the pipeline 6. Such a press-fit produces a non-positive connection of pipeline 6 and pipe socket 7.

Figure 2:
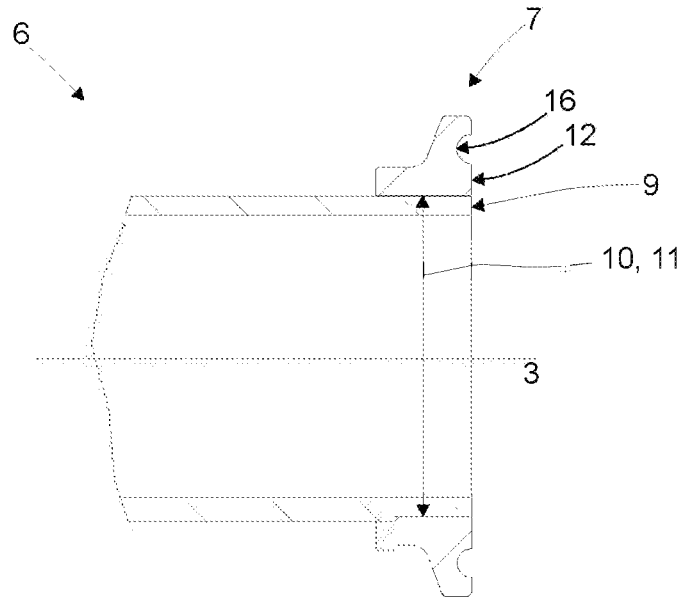
FIG. 2 is a sectional view of the pipeline and the pipe socket, the pipe socket being plugged axially onto the pipeline.
Figure 3:
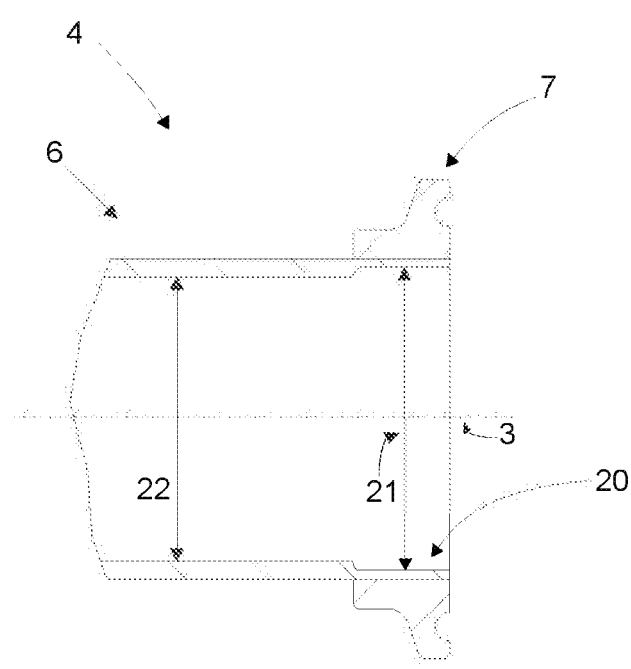
FIG. 3 is a sectional view of a pipeline unit.

The pipeline unit 4 comprises a pipe socket 7 axially plugged to the pipeline 6. In contrast to the arrangement shown in FIG. 2, in FIG. 3 the pipeline 6 is fixed in the pipeline unit 4 by radial expansion, in particular of the pipeline walls, in the pipe socket 7 by means of press fit 20. The pipe socket 7 is thus non-positively connected to the pipeline 6. Other conventional connecting options, such as welding the pipe socket 7 to the pipeline 6, are possible in other embodiments, but not illustrated here.

The radial expansion is produced by means of a tool, in particular a swaging tool, and is also described as final tube expansion of the pipeline 6. Following the radial expansion, a cross-sectional area of the pipeline 6 is greater in the region of the expansion than an original cross-sectional area of the pipeline 6. As a result of the radial expansion of the pipeline 6, the expanded pipeline inner diameter 21 is therefore greater in the region of an overlap of pipe socket 7 and pipeline 6 than the original pipeline diameter 22.

By the structure 18 located on the pipe section inner surface 14 in the form of raised areas 19, the expansion of the pipeline 6 produces a positive connection between pipeline 6 and pipe socket 7 in addition to the non-positive connection. The structure 18 can have a different form as well, e.g., a groove or the like.

In other embodiments not illustrated, the pipe section inner surface 14 and/or the pipeline outer surface 8 are/is at least partially structured before the radial expansion of the pipeline 6.

A sealing device 1 having a seal insert 23 is located axially between the pipeline units 4.

Figure 5:
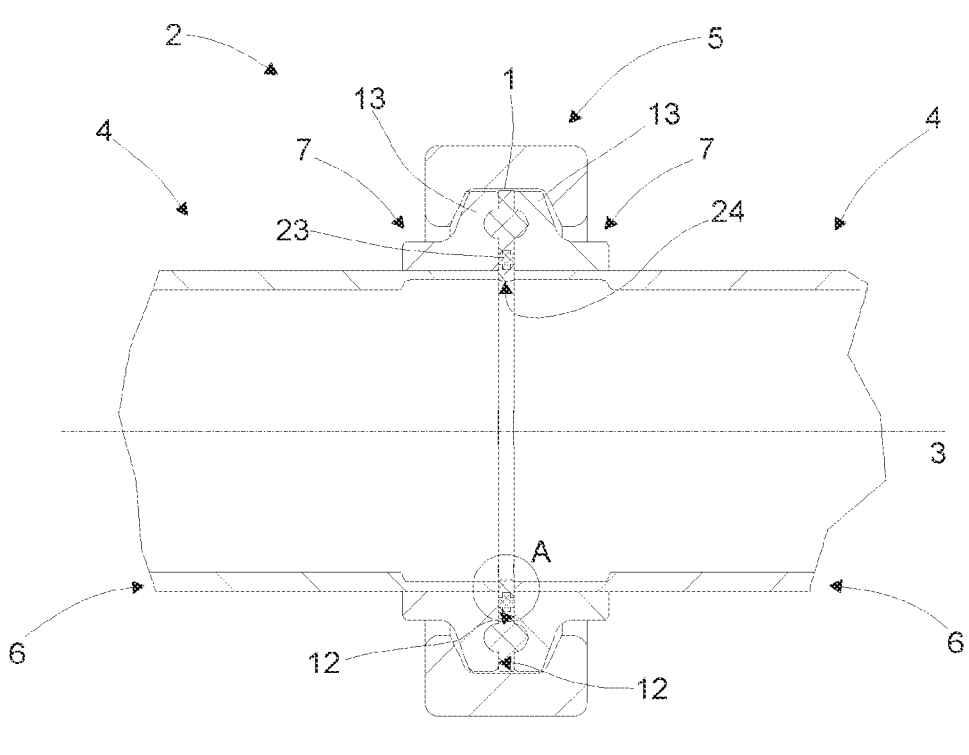
FIG. 5 is a sectional view of an embodiment of a pipeline arrangement with a section A in the region of two pipeline units clamped to each other.
Figure 6:
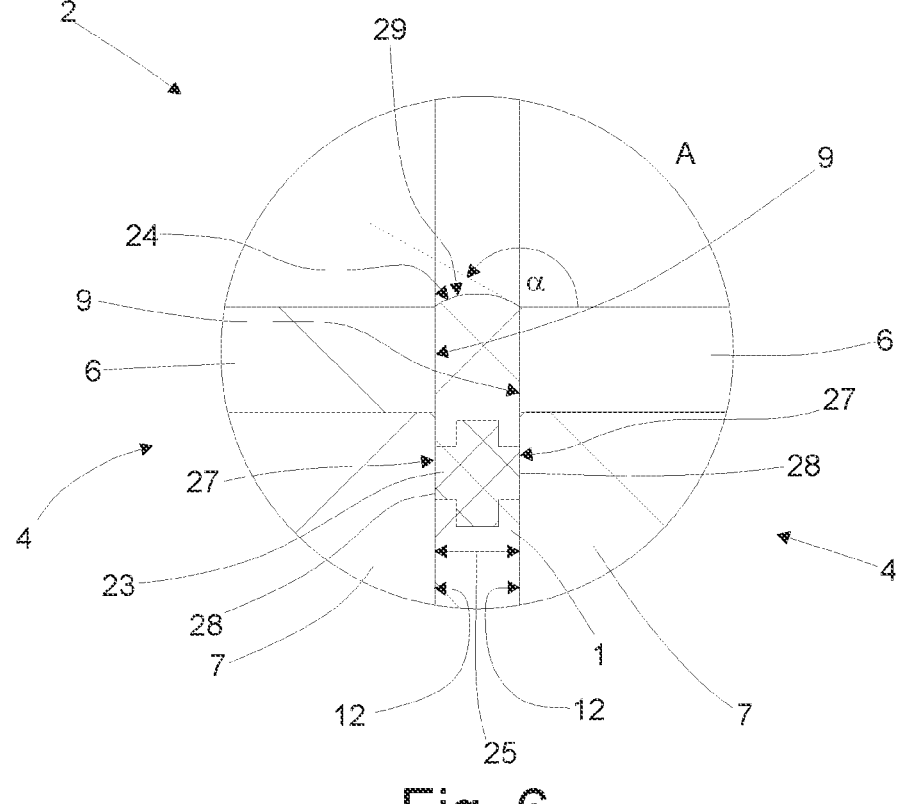
FIG. 6 is a detailed view of the section A shown in FIG. 5 in the region of the two pipeline units clamped to each other.

FIG. 5 is a sectional view of an embodiment of a pipeline arrangement 2, with a section A in the region of two mutually clamped pipeline units 4.

The pipeline arrangement 2 has a sealing device 1 located axially between the flange section end faces 12 of the pipe sockets 7 formed at the flange sections 13. The sealing device 1 is configured to form a defined transition 24 between the two mutually clamped pipeline units 4. The defined transition 24 is formed by the clamping forces acting on the sealing device 1 in the clamping process.

A detailed view—described below—of the mutually clamped pipeline units 4 shown in section A of FIG. 5 shows the defined transition 24 in an enlarged form. By the defined transition 24 an accumulation of residues or solids of the medium or media flowing through the pipeline arrangement 2 is reduced or eliminated.

The sealing device 1 furthermore has a seal insert 23. The seal insert 23 defines an axial minimum distance 25 between the two pipeline units 4, so that the two pipeline units 4 are in the clamping process of the pipeline arrangement 2 subjected to clamping forces defined by the axial minimum distance 25 determined by the seal insert 23.

The pipeline arrangement 2 is axially clamped by means of a clamping device 5. For this purpose, the flange sections 13 of the pipe sockets 7 of the two pipeline units 4 are axially clamped together by means of a clamping device 5. In the illustrated embodiment the clamping device 5 is advantageously designed as an articulated clamp 26. By means of the clamping device 5 designed as an articulated clamp 26, the clamping forces acting on the sealing device 1, which—with respect to area—correspond to a contact pressure, can additionally be adjusted by a wing nut or the like closing the articulated clamp 26. The clamping device 5 can also be designed as a flange/screw connection.

Alternatively standard parts, such as measuring instruments, valves, flaps or the like, can be used as pipeline units 4 and form a pipeline arrangement 2 together with another, second pipeline unit 4.

The seal insert 23 of the sealing device 1 is provided with a seal insert end face 28 designed as a stop 27. By the seal insert 23 an axial minimum distance 25 therefore can be or is defined between the two pipeline units 4. The pipeline end face 9 and/or the flange section end face 12 adjoin(s) in the clamped state of the pipeline arrangement 2 the seal insert end faces 28 of the seal insert 23 of the sealing device 1. In this way the minimum distance 25 between the two pipeline units 4 of the pipeline arrangement 2 and thus the clamping forces acting on the sealing device 1 are set or adjusted precisely.

The transition 24 defined by the clamping forces determined by means of the seal insert 23 is preferably designed such that the curvature 29 with respect to a pipeline inner diameter 21 forms an obtuse angle α. In a particularly preferred form the obtuse angle α is an angle α between 100° and 170°, most notably between 120° and 150°. As a result, residues of the medium or media flowing through the pipeline arrangement 2 are reduced or prevented.

The sealing device 1 is provided with a data medium 31, which is located in the seal 30 and comprises an electronic data memory 32, to which seal-specific information can be or is written. The data medium 31 of the sealing device 1 is preferably designed as an RFID transponder 33. The data memory 32 of the data medium 31 can therefore be written on and/or read more easily, in particular contactlessly, e.g., with an RFID reader and/or writer. Product, maintenance, production or service data in particular are always available directly at the sealing device as seal-specific information. The production date, the next maintenance date, the state of the seal itself, the date of the last inspection etc. can be stored on the data medium 31, for example.

The seal 30 is preferably designed as a gasket, materials such as elastomers, pressed fibres, aramid fibres, carbon fibres, mineral fibres, metal, copper being available as seal materials. Sheathed sealing devices, in particular sheathed gaskets, are preferred as well, these comprising a core (any gasket material such as fibre-reinforced plastic, PTFE etc.) covered by PTFE or metal, preferably steel or corrosion-resistant nickel alloys. The sheathing protects the core against chemical attack by the medium to be sealed. The seal 30 is preferably made of rubber, particularly preferable of nitrile rubber or perfluoro rubber, silicone, polyethylene or polytetrafluoroethylene.

The seal 30 of the sealing device 1 has a seal outer surface 35, which extends radially around a sealing device central axis 34 and on which a seal section 36 having the data medium 31 is located. The seal section 36 is designed in the form of a pan handle. In the state of use the pipeline central axis 3 and the sealing device central axis 34 correspond to each other. In a variant not illustrated, the seal section 36 is missing, for example, so that the data medium 31 is located in the seal 30. Other arrangements in the sealing device 1 are possible and conceivable as well.

Figure 10:
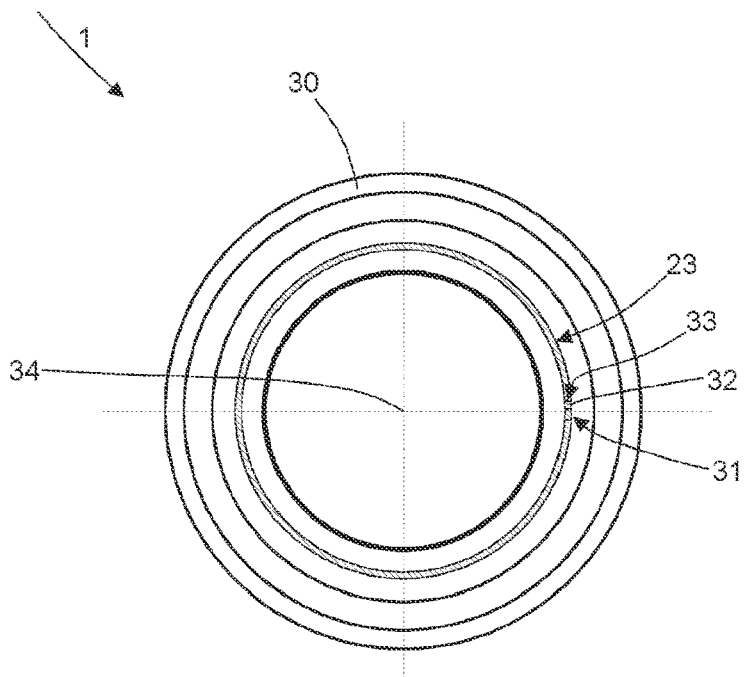
FIG. 10 is a top view of a second embodiment of a sealing device having a seal and a data medium.

In a further preferred embodiment, the data medium 31 is designed as a part of the seal insert 23. Such an embodiment is illustrated in FIG. 10, for example. In this way the advantages of the seal insert 23 and the data medium 31 can be combined. In addition, the data medium 31 can no longer be removed easily in the state of use.

In the further, second embodiment of the sealing device 1 according to FIG. 10, the data medium 31 assigned to the seal 30 and comprising the data memory 32 is thus located in the seal 30. The data medium 31 located in the seal 30 is therefore definitely assigned to the seal 30. The data medium 31 is cast into the seal 30, whereby the data medium 31 is connected to the seal 30 in a substantially inseparable manner. The seal 30 and the data medium 31 can in particular not be separated without destroying the seal 30.

The clamping device 5 is expediently designed as an articulated clamp 26, and the seal section 36 is routed to the outside via an articulated clamp joint of the clamping device 5.

The sealing device 1 for sealing a pipeline arrangement 2 is provided with an electronic data medium 31, which is located in the seal 30 and to which seal-specific information can be or is written, wherein the data medium 31 is cast with the seal 30 as an insert part in a method for the production of the sealing device 1, involving the steps of placing the data medium 31 in a tool, filling the tool with the sealing material and removing the sealing device 1 produced from the tool.

The method used is preferably an injection moulding method or a compression moulding method. It is particularly preferred if the sealing device 1 produced by the method is a sealing device 1 according to one of the embodiments of the sealing device 1 described herein.

In a further preferred method, the seal insert 23 is placed in the tool in step a, the data medium 31 forming a part of the is seal insert 23.

Figure 4:
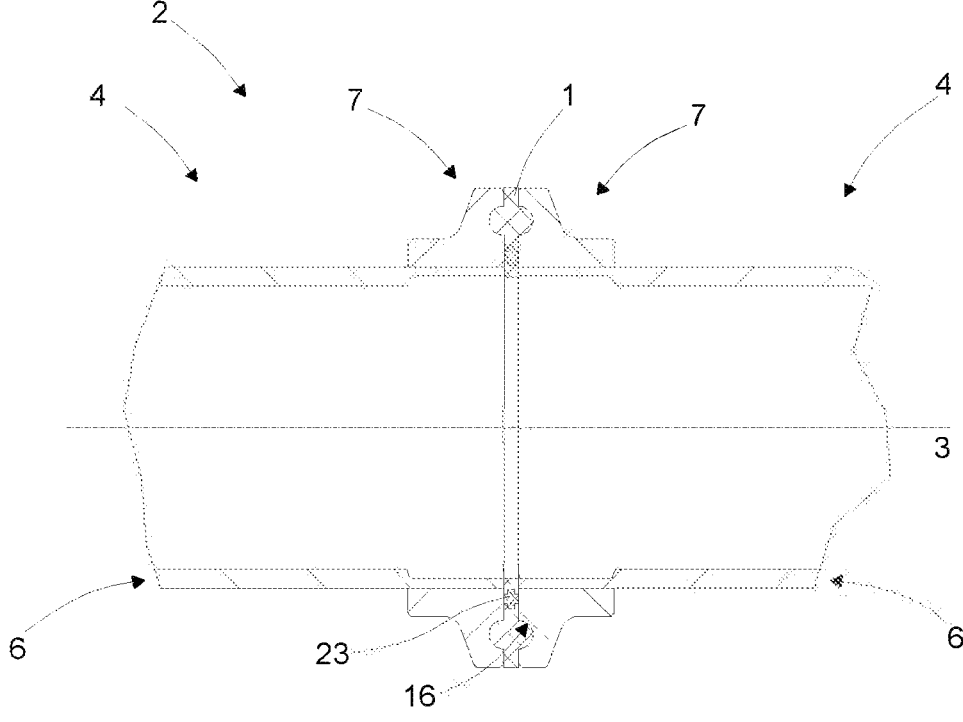
FIG. 4 is a sectional view of two pipeline units, a seal being located between the pipeline units.

In addition, FIGS. 4 and 5 show a preferred pipeline system, the pipeline system comprising a sealing device 1 and a pipeline arrangement 2. The sealing device 1 and the pipeline arrangement 2 are preferably designed in accordance with the description of the figures.

Figure 11:
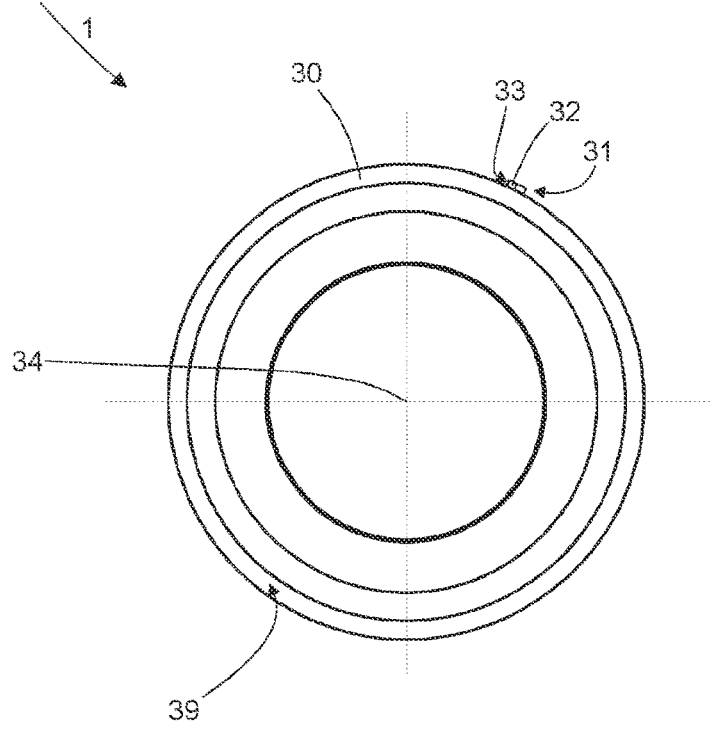
FIG. 11 is a top view of a third embodiment of a sealing device lo having a seal and a data medium.

A top view of a third embodiment of a sealing device 1 having a seal 30 and a data medium 31 is shown in FIG. 11. In this the data medium 31 having the data memory 32 is located outside the seal 30 at the seal lateral surface 39.

Figure 12:
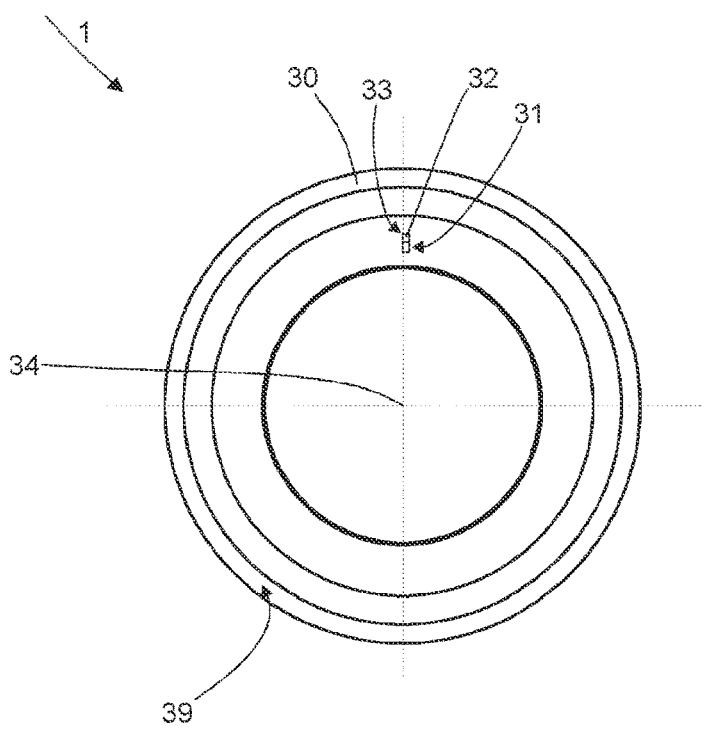
FIG. 12 is a top view of a fourth embodiment of a sealing device having a seal and a data medium.

FIG. 12 shows a fourth embodiment of a sealing device 1, wherein here too the data medium 31 assigned to the seal 30 and comprising a data memory 32 designed in the form of an RFID transponder 33 is located outside the seal 30. The data medium 31 assigned to the seal 30 is expediently located on the outside of the seal 30. The data medium 31 is located at the seal lateral surface 39 of the seal 30.

Figure 13:
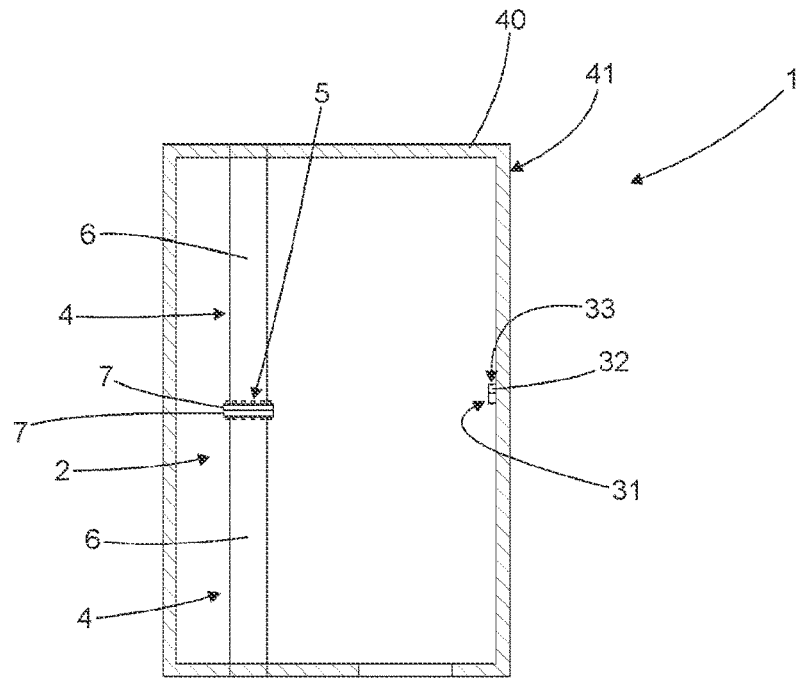
FIG. 13 is a top view of a room with a fifth embodiment of a sealing device having a seal and a data medium.

As shown in a fifth embodiment shown in FIG. 13, the data medium 31 can also be separated spatially from the seal 30. The data medium 31 is provided at location different from that of the seal 30, here at the wall 40 of a space 41, so that the seal 30 and the data medium 31 are not in direct contact with each other. This eliminates the possibility that a medium carried in the pipeline arrangement 2 with the pipeline units 4 and having is to be sealed against the environment by means of the seal 30 could come in contact with the data medium 31. The possibly aggressive medium, such as an acid, an alkali or the like, can then corrode the seal 30 in particular, but the data medium 31 can always be read, so that the information stored on the data medium 31 can be retrieved at any time.

The invention claimed is:

1. A pipeline system comprising,
a pipeline arrangement and a sealing device for sealing the pipeline arrangement,
the pipeline arrangement having two pipeline units with a pipeline central axis and a clamping device,
wherein each pipeline unit comprises:

a pipeline having a pipeline outer surface,
a pipeline end face,
a pipeline outer diameter, and
a pipe socket with a pipe socket inner diameter, wherein the pipe socket is provided with a flange section having a flange section end face and a pipe section having a pipe section inner surface,
wherein the clamping device clamps the flange sections of the pipe sockets of the two pipeline units axially to each other,
wherein the sealing device has in a position of use, a seal located axially between the flange section end faces of the pipe sockets,
wherein the sealing device has a data medium assigned to the seal and comprising an electronic data memory to which seal-specific information can be or is written,
wherein the seal of the sealing device has a sealing outer surface, which extends radially around a sealing device central axis, on which a seal section is arranged, and wherein the seal section comprises the data medium,
wherein the sealing device forms a transition between the pipeline units which are clamped to one another,
wherein the sealing device comprises a seal insert that defines an axial minimum distance between the two pipeline units, and
wherein the transition between the pipeline units is defined by clamping forces which are set by the seal insert such that a curvature with respect to a pipeline inner diameter forms an obtuse angle.

2. The pipeline system of claim 1, wherein the seal section comprises an elongated body extending in a radial direction from the seal outer surface.

3. The pipeline system of claim 1, wherein the data medium is an insert part of the seal section.

4. The pipeline system according to claim 1, wherein the data memory of the data medium is readable.

5. The pipeline system according claim 1, wherein the data memory of the data medium is readable in a contactless manner.

6. The pipeline system according to claim 1, wherein the data medium of the sealing device is designed as an RFID transponder.

7. The pipeline system according to claim 1, wherein the seal insert has a seal insert end face designed as a stop.

8. The pipeline system according to claim 1, wherein the clamping device is designed as an articulated clamp and the seal section is guidable or guided towards the outside by an articulated clamp joint of the clamping device.

9. The pipeline system according to claim 1, wherein the seal is made of rubber.

* * * * *